July 1, 1941.   R. K. POTTER   2,247,666
DIRECTIONAL ANTENNA SYSTEM
Filed Aug. 2, 1939   6 Sheets-Sheet 2
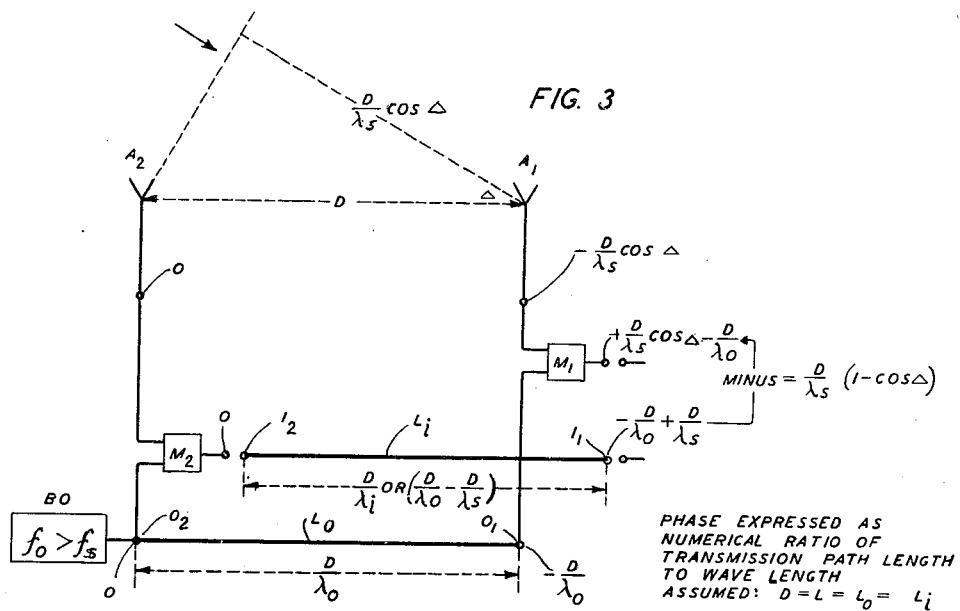
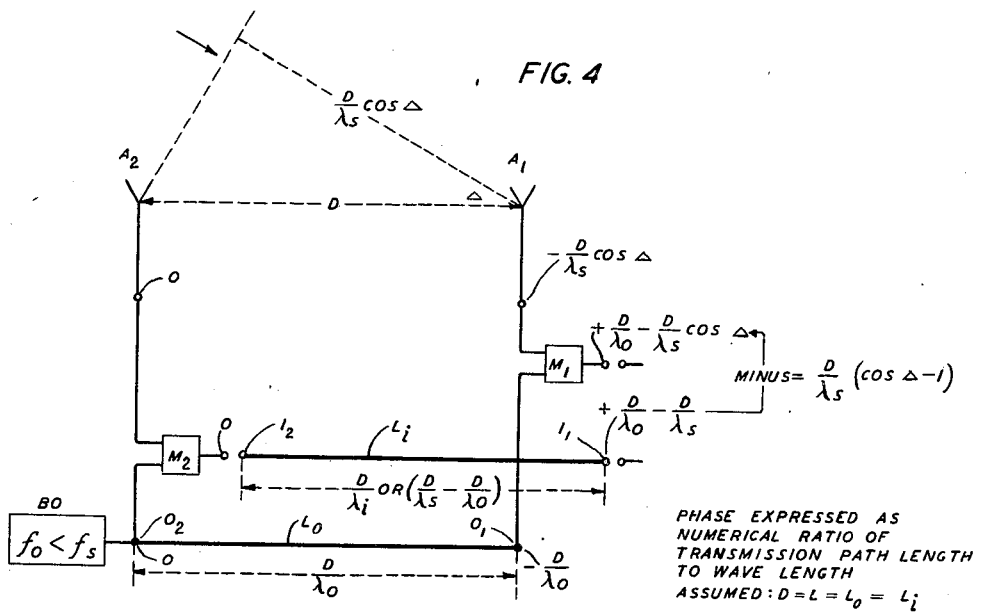
INVENTOR
R. K. POTTER
BY
E. V. Griggs
ATTORNEY July 1, 1941.  R. K. POTTER  2,247,666
DIRECTIONAL ANTENNA SYSTEM
Filed Aug. 2, 1939  6 Sheets-Sheet 3
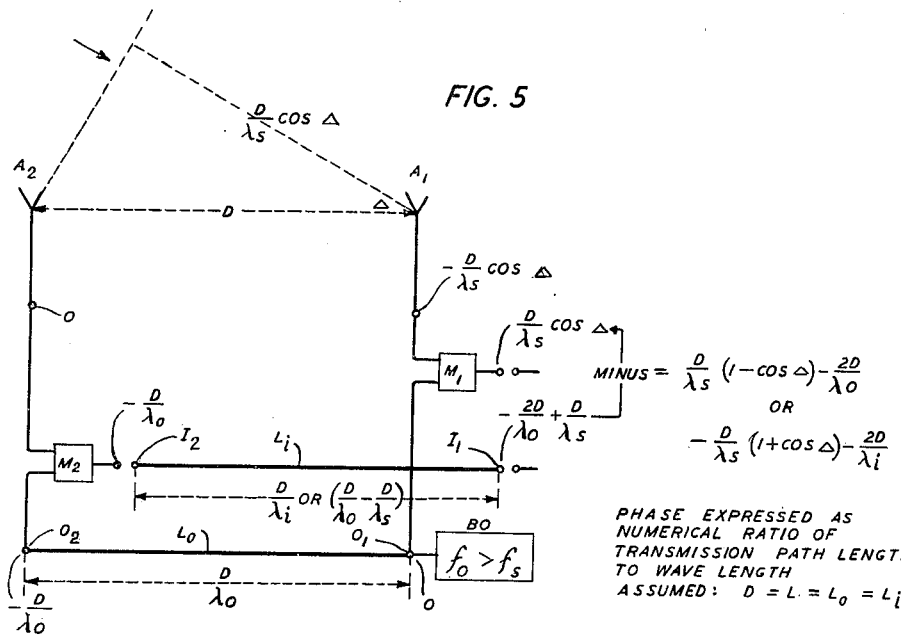
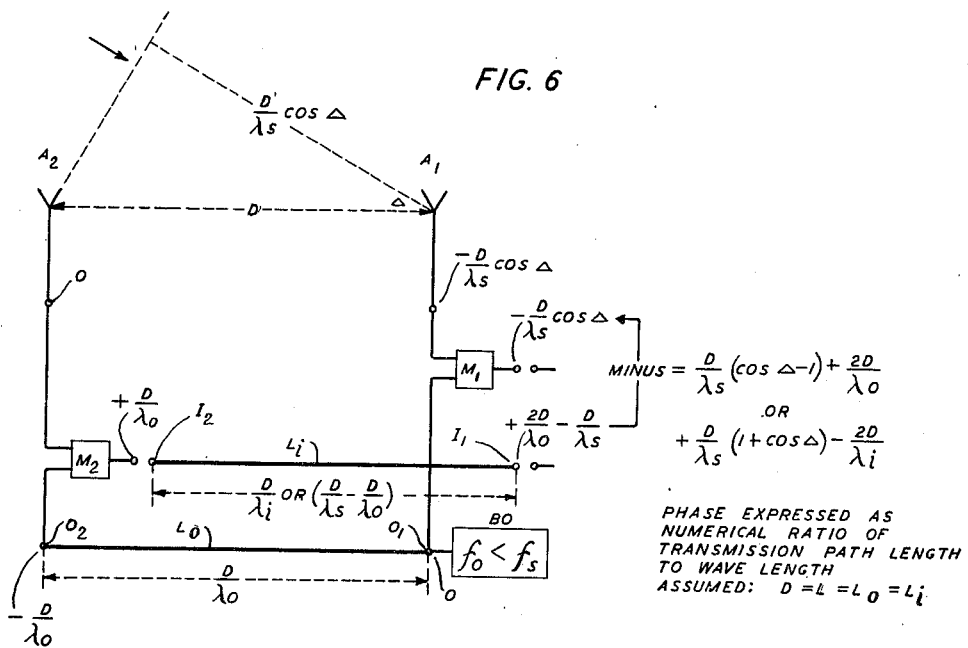
INVENTOR
R. K. POTTER
BY
*E. V. Griggs*
ATTORNEY July 1, 1941.  R. K. POTTER  2,247,666
DIRECTIONAL ANTENNA SYSTEM
Filed Aug. 2, 1939  6 Sheets-Sheet 5

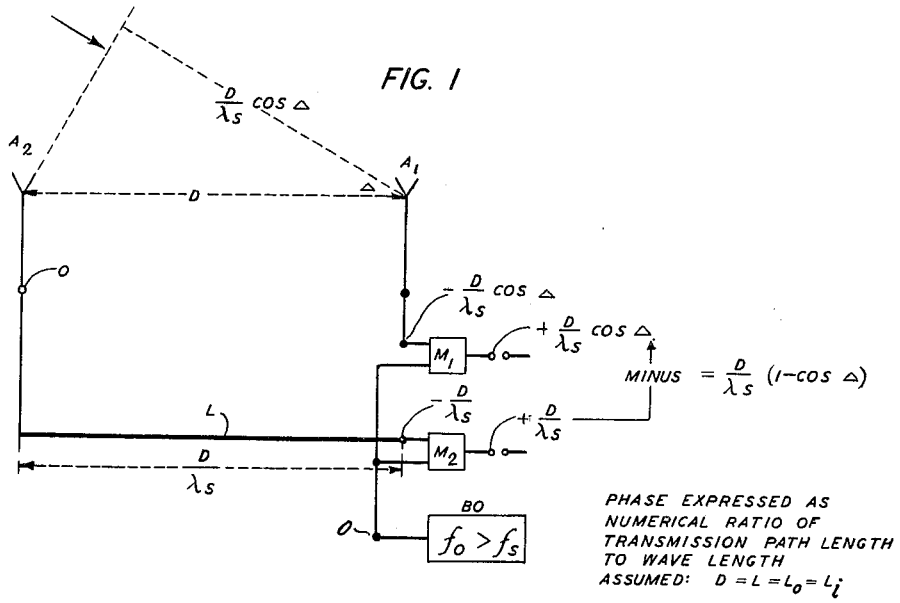
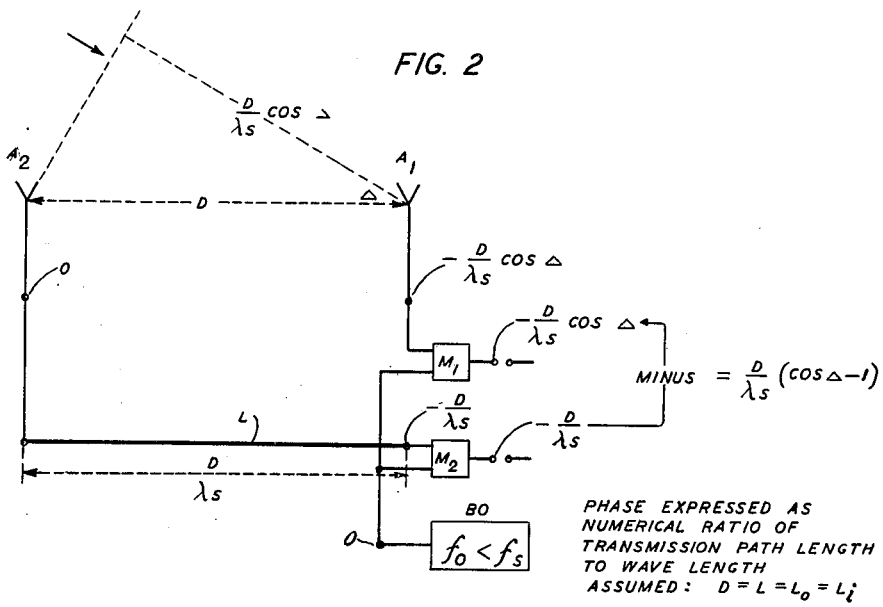

INVENTOR
R. K. POTTER
BY
E. V. Griggs
ATTORNEY

July 1, 1941. R. K. POTTER 2,247,666
DIRECTIONAL ANTENNA SYSTEM
Filed Aug. 2, 1939 6 Sheets-Sheet 6

INVENTOR
R. K. POTTER
BY
E. J. Griggs
ATTORNEY

Patented July 1, 1941

2,247,666

UNITED STATES PATENT OFFICE 2,247,666

DIRECTIONAL ANTENNA SYSTEM

Ralph K. Potter, Madison, N. J., assignor to Bell Telephone Laboratories, Incorporated, New York, N. Y., a corporation of New York Application August 2, 1939, Serial No. 287,911

14 Claims. (Cl. 250—11)

This invention relates to radio communication systems, and more particularly to methods and means for steering the directional characteristic of an antenna array.

The invention is particularly concerned with multiple unit antenna systems generally of the type disclosed in Patent 2,041,600 of H. T. Friis, issued May 19, 1936. In systems of this type each antenna unit of the array is connected with the terminal station of the system, which may be either a receiving station or a transmitting station, by its own individual high frequency conductor. The expense of such conductors is considerable, as they must transmit efficiently and as nearly as possible without distortion a wide range of extremely high frequencies. It is one of the objects of this invention to reduce the amount of such expensive high frequency conductor in radio communication systems of the multiple unit type.

In systems of this type it is also customary to steer the directional characteristic of the antenna array by means of phase changers, one of which is included at the terminal station in each of the paths individual to the various antenna units of the system, these phase changers being arranged to be rotated as a unit, but at rotation ratios proportionate to the spacing between each corresponding antenna unit and an extreme unit of the array. It is one of the objects of the present invention to dispense with these steering phase changers and to steer the directional characteristic of the array by varying the frequency of an oscillator the output of which is so combined through modulators, one for each antenna unit, with the signal waves arriving at each unit as to create a phase relationship between the units at the receiver that gives the array the proper directional characteristic for any desired particular signal frequency arriving at any particular angle.

The manner in which these and other objects of the invention are accomplished will be fully explained in the description which follows. Generally, it may be said that the system comprehends an arrangement in which a modulator is placed at each antenna unit, and a high frequency line carrying the oscillator output is carried the length of the array and has connection with each of the antenna unit modulators along the array. The spacing along the oscillator line of the modulator connecting points is thus substantially equal to the spacing between the associated adjacent antenna units. At each modulator intermodulation occurs between the oscillator wave and the arriving signal waves to produce difference intermediate frequencies containing the signal components of the high frequency signal waves. These difference products of modulation are carried to the terminal receiving station over an intermediate frequency line which, on account of the lower frequencies that it carries, may be of a simpler construction and less expensive than the high frequency lines that at present are used to connect each antenna unit with the terminal station. The phase relations of the signal components at the station terminals of each of the intermediate frequency lines may be shown mathematically to be the same as the phase relations of these components when they are transmitted directly to the station over high frequency lines individual to each antenna, as in the present multiple unit systems. Therefore, the incoming terminals of the intermediate frequency lines may be connected with the customary uncontrolled phase changers and the directional characteristic of the array steered in the same manner as in the present systems.

As a consequence, however, of the extension of the high frequency oscillator line along the array and its connection with the successive modulators at spacings substantially equal to the antenna unit spacings, the directional characteristic of the array may be steered merely by adjusting the oscillator frequency. The phase shift along the high frequency oscillator line is related to the length of the line as measured in terms of oscillator wave-length. Consequently, phase difference between the modulator outputs, connected at equally spaced intervals with the line, varies with variations in the beat oscillator frequency. It follows that for every incoming angle of arrival of any given signal wave there will be one or more beat oscillator frequencies for which in-phase intermediate frequency currents are obtained at the combining points of successive modulator outputs. By varying the oscillator frequency it is thus possible to match the phase of the oscillator wave in the modulators of all the units of the array with the phase of any signal frequency arriving at any angle in such a way as to produce an in-phase relation at the receiver as between the contributions of all the units. Obviously, this is true whether the arrival angle is in a vertical plane or in a horizontal plane; and, therefore, assuming the antenna units of the array are designed to produce the appropriate unit lobe, the steering of the array by variation of beat oscillator frequency may be effected as well in a horizontal plane as in a vertical plane. In the present embodiment of the invention, however, the antenna units are disclosed as being of the rhombic type to produce unit lobes particularly adapted for effective steering of the array directional characteristic in a vertical plane.

The invention will be more fully explained by reference to the accompanying drawings, in which:

Figs. 1 to 6, inclusive, present graphically the fundamental relations expressed mathematically upon which the present invention is based;

Figure 14:
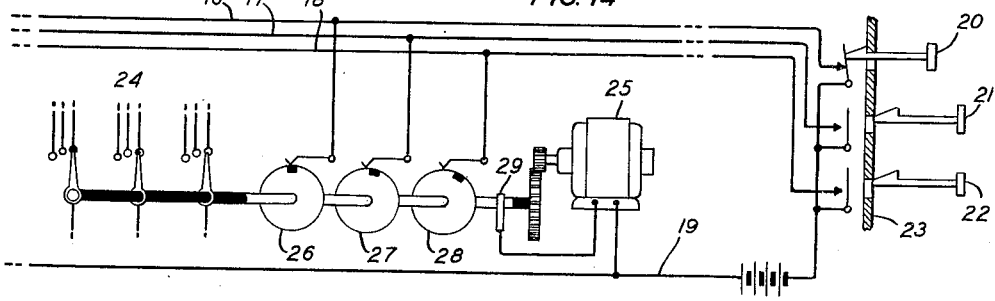
Figure 15:
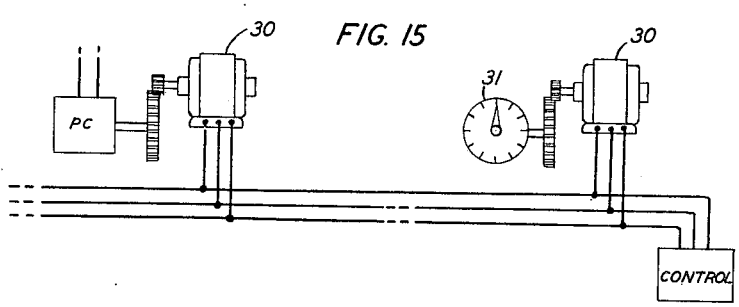

Fig. 14 shows diagrammatically a remote control arrangement for effecting from the terminal station the selection of any desired one of the tuned modulators at each of the various antenna units of the array; and Fig. 15 shows diagrammatically an arrangement for controlling from the terminal station the phase changers located at the remote antenna units of the array and at the same time indicating to the station operator the extent to which the phase at an adjacent unit has been shifted.

In all the schematic drawings the circuit interconnections between the various elements are represented in part by light lines and in part by heavy lines. The light lines represent portions of the interconnections in which the path lengths are either so short as to be negligible or are equal for the different units and therefore inconsequential. The heavy lines indicate portions of the interconnections having path lengths which constitute factors in the determination of phase relations over the paths which they represent.

Reference will first be made to Figs. 1 to 6, inclusive. In considering these figures it is important to note that all of the expressions denote phase angles in units of one complete cycle of rotation or 360 degrees. In order to compress the mathematical expressions, symbols denoting phase angle have in every case been omitted; but in every case the resultant value must be understood as being expressed in units of complete 360-degree rotation. In other words phase relationship is expressed in terms of the numerical ratio of length of transmission path to wavelength. The following notation is used:

$f_s$ = signal frequency
$f_o$ = oscillator frequency
$\lambda_s$ = signal wave-length
$\lambda_o$ = oscillator wave-length
$\lambda_i$ = intermediate frequency wave-length
$\Delta$ = signal angle of arrival
$D$ = antenna spacing
$L$ = length of high frequency line
$L_o$ = length of oscillator line
$L_i$ = length of intermediate frequency line It is assumed that $D=L=L_o=L_i$, and that the wave velocity is the same in line and in space. It is further assumed that the vertical leads from the antennas are made short and equal to each other, and may therefore be neglected. This latter assumption is also made with respect to the other interconnecting conductors at the antennas and at the receiving station.

Each of the Figures 1 to 6, inclusive, schematically represents the first two antenna units $A_1$ and $A_2$ of an array, with a modulator, $M_1$ and $M_2$, respectively for each unit, and an oscillator BO common to the units. In the box representing each oscillator are the symbols $f_o$ and $f_s$ indicating oscillator and signal frequencies, respectively, and an indication of which of the frequencies is above and which below the other. In each case the position of the oscillator indicates whether it is located at the station, or at the distant antenna unit or remote end of the array. Figs. 1 and 2 represent an arrangement wherein the modulators individual to each antenna unit as well as the oscillator are located at the receiving station, as in the ordinary multiple unit system such as that of the previously mentioned Friis patent. Figs. 3 to 6, inclusive, represent arrangements in accordance with the present invention in which the modulators are located at or in close proximity to their associated antenna units and the oscillator is located either at the receiving station or at the distant end of the array.

A comparison of Fig. 3 with Fig. 1 and Fig. 4 with Fig. 2 shows that each of the arrangements is the electrical equivalent of the one with which it is compared with respect to phase differences between the intermediate frequency outputs of two adjacent antenna units at their combining points at the receiving station. As indicated in Fig. 1, the phase change of the signal wave from $A_2$ to $A_1$ along the space path is equal to $D/\lambda_s \cos \Delta$. The phase change along high frequency line L from $A_2$ to $A_1$ is $D/\lambda_s$. As the direction of wave propagation is from $A_2$ to $A_1$ both of these quantities are minus quantities at the inputs to their respective modulators $M_1$ and $M_2$. The phase of the oscillator, as it is located at the station, may be assumed to be O; and as the signal frequency, as indicated at BO, is below the oscillator frequency, the signal phase is subtracted from the oscillator phase in modulation, and the two quantities become $+D/\lambda_s$ and $+D/\lambda_s \cos \Delta$ at the modulator outputs. Assuming that the output of modulator $M_2$ is made the reference, the phase difference is $D/\lambda_s - D/\lambda_s \cos \Delta$ or $D/\lambda_s (1-\cos \Delta)$, expressed, as has been indicated, in complete cycles of 360 degrees.

The above may now be compared with the action which takes place in the arrangement of Fig. 3, where the modulator $M_2$ is located in close physical proximity to its antenna unit, instead of at the station, and the oscillator BO is moved to unit $A_2$ and is connected with the station over oscillator line $L_0$. As modulator $M_2$ is now at unit $A_2$, its output is connected with the station over an intermediate frequency line $L_i$. The phase change along $L_0$ from connecting point $O_2$ to connecting point $O_1$ is $D/\lambda_o$, and is a minus quantity at the station. The phase change along $L_i$ from point $I_2$ to point $I_1$ is $D/\lambda_i$; and this may be expressed as its equivalent $D/\lambda_o - D/\lambda_s$, as the signal frequency is assumed to be below the oscillator frequency.

As zero phase may be assumed for both oscillator input and signal input to modulator $M_2$, the output phase will be zero. Therefore the phase of modulator $M_2$ output at point $I_1$ after traversing the intermediate frequency line will be $O - (D/\lambda_o - D/\lambda_s)$ or $-D/\lambda_o + D/\lambda_s$. In the case of modulator $M_1$, the input oscillator phase is $-D/\lambda_o$ and the input signal phase is $-D/\lambda_s \cos \Delta$. The oscillator frequency being above the signal frequency, the phase at the output of $M_1$ will be $-D/\lambda_o - (-D/\lambda_s \cos \Delta)$ or $D/\lambda_s \cos \Delta - D/\lambda_o$.

Now, assuming as in the case of Fig. 1 that the output of modulator $M_2$ is made the reference, the phase difference at the station between the two modulator outputs is $(-D/\lambda_o + D/\lambda_s) - (D/\lambda_s \cos \Delta - D/\lambda_o)$ or $D/\lambda_s (1 - \cos \Delta)$. This as before indicated, is expressed in complete cycles of 360 degrees, and may be seen to be the same phase difference between units at the station as is obtained in the multiple unit system arrangement of Fig. 1 where the oscillator and both modulators are located at the station.

Fig. 2 differs from Fig. 1 and Fig. 4 from Fig. 3 merely with respect to the relation of oscillator to signal frequency, the oscillator frequency being assumed to be below the signal frequency in Figs. 2 and 4, whereas it is assumed to be above the signal frequency in Figs. 1 and 3. A comparison of Figs. 2 and 4 shows that the phase difference between adjacent modulator outputs at the station is the same in one case as the other, the difference in each case being $D/\lambda_s (\cos \Delta - 1)$. This difference may also be expressed as $-D/\lambda_s (1 - \cos \Delta)$, and is therefore the same phase difference as in the case of Figs. 1 and 3 excepting that the phase is of opposite sign.

In practical embodiments of the invention, such as will be described later, it may be simpler and more convenient to locate the oscillator at the terminal station in order to facilitate its frequency control and adjustment. Figs. 5 and 6 show how the phase relations between the outputs of adjacent units are affected when this is done. The mathematical steps involved in the process are set forth in connection with the drawings, and do not need to be repeated here in view of the explanation that has been made of the similar processes in connection with Figs. 1 and 3. They show that the phase difference between the outputs of adjacent modulators in the arrangement shown in Fig. 5 is $D/\lambda_s (1 - \cos \Delta) - 2D/\lambda_o$, and that in the case of the arrangement shown in Fig. 6 it is $$D/\lambda_s (\cos \Delta - 1) + 2D/\lambda_o$$

It will be noted that the second term of the expression in each case is the ratio of twice the antenna spacing to the oscillator wave-length. But as in a system of this type a fixed frequency separation is always maintained between the signal frequency and the oscillator frequency to produce a constant intermediate frequency, the expression of Fig. 5 may be rewritten in terms of signal wave-length and intermediate frequency wave-length as $-D/\lambda_s (1 + \cos \Delta) - 2D/\lambda_i$, and the expression of Fig. 6 as $$D/\lambda_s (1 + \cos \Delta) - 2D/\lambda_i$$

The second term in each expression, it will be noted, is invariable, as both the spacing D and the intermediate frequency wave-length $\lambda_i$ are constant, and do not vary in the tuning and steering operations of the system. The constant factor in the expression is satisfied in the initial setting of the phase changers, after which their unicontrolled operation by the employment of gear ratios corresponding to the spacing ratios between successive antenna units and the base antenna is effected in accordance with the variation of the factor represented in the first or variable term of the expression. That is, after the initial setting of the phase changers, the steering operation for the various signal frequencies and angles of arrival is accomplished by the rotation of the phase changers in the same manner as in the arrangements represented in Figs. 1, 2, 3 and 4. Thus, in the case of the arrangement of Fig. 5, if the spacing D is assumed to be 200 meters and the intermediate frequency one megacycle with a wave-length $\lambda_i$ of 300 meters, the value of the expression $-2D/\lambda_i$ is $-480$ degrees, and each successive phase changer would be given an initial setting 120 degrees more negative than the preceding phase changer. Thereafter the steering rotation of the phase changers from this initial setting is in accordance with the expression $-D/\lambda_s (1 + \cos \Delta)$.

Reference will now be made to the figures of the drawings which represent schematically various embodiments of the principles of the present invention. The elements and interconnections in the drawings are shown merely by blocks and single lines, it being understood that the blocks may represent units of apparatus of an entirely conventional type and that the lines may represent conductors proper with respect to number and character for establishing the interconnections indicated.

Figure 7:
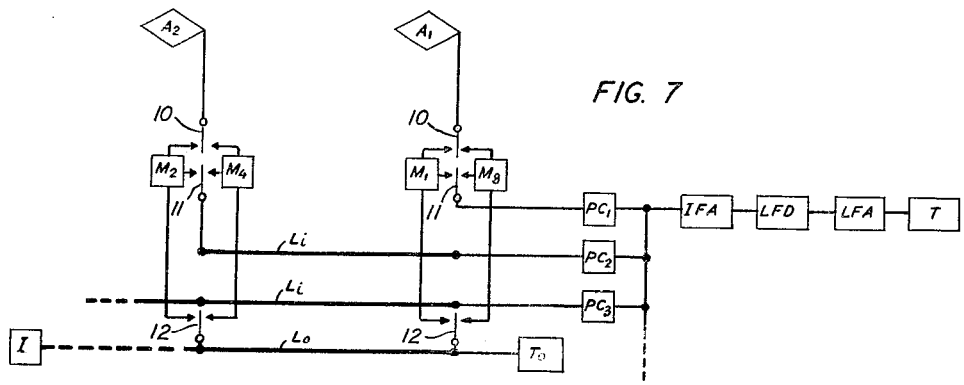
Fig. 7 illustrates schematically the terminal station and the first two antenna units of an array designed for the reception of a plurality of signal frequencies, each antenna unit being provided with modulators and connections with an oscillator line, the directional characteristic being steered by uncontrolled phase changers at the receiving station.

Referring first to Fig. 7, this represents the receiving station and the first two antenna units of a multiple unit array. Each of the antenna units, as $A_1$ and $A_2$, is provided with modulators $M_1$, $M_3$ and $M_2$, $M_4$, respectively, and each unit has connection with its associated phase changer $PC_1$, $PC_2$, etc. at the receiving station. The outputs of the phase changers are carried through intermediate frequency amplifier IFA, low frequency detector LFD and low frequency amplifier LFA to the translating device or signal receiver T. The tuning oscillator TO is located at the receiving station, and its output is carried along the length of the array by means of a high frequency oscillator line $L_0$. The oscillator line is terminated at its far end in the impedance I equal to the characteristic impedance of the line, the purpose being to avoid reflections. At each antenna unit there is a connection from the oscillator line $L_0$ to the corresponding unit. Thus, the unit intervals of separation of the individual antenna systems along the oscillator line are the same as they are in space. To avoid transmission irregularities along the oscillator line at the points where it is connected with the modulators of the successive antenna units, a high impedance type of connection is employed, as, for instance, by way of a condenser of very small capacity.

As has been indicated, the modulators, instead of being placed at the station as has been the practice in systems of this general type, are moved out to and located at their respective antenna units. As the signal frequencies to be received in a system of this type are relatively few in number and are exactly controlled, it is convenient to have a separate tuned modulator at each antenna unit for each of the signal frequencies at which communication is to take place. In the present instance provision is indicated for the reception of two signal frequencies at each unit, the modulators $M_1$ and $M_2$ at the respective units being tuned for the reception of one of the signal frequencies and modulators $M_3$ and $M_4$ at the respective units being tuned for the other signal frequency. If additional signal frequencies are to be used, a corresponding additional number of appropriately tuned modulators will be provided at each unit.

Switching means consisting of the members 10, 11 and 12 and their associated contact points are provided at each unit for selecting and bringing into operative relation with the system any desired one of the tuned modulators at each unit. The switching members 10, 11 and 12 respectively control the connection of the antenna, the connection of the intermediate frequency line and the connection of the oscillator line with the particular modulator that is selected for use. The members 10 and 12 respectively connect the antenna and the oscillator line with the modulator input, and the member 11 connects the modulator output to the corresponding intermediate frequency line $L_i$ which extends to the associated phase changer at the terminal station. The length of the intermediate frequency line that connects the modulator outputs at antenna $A_1$ with the corresponding phase changer may be assumed to be negligible, as antenna $A_1$ is assumed to be located at the station. Each succeeding antenna of the array is connected with the station over an intermediate frequency line substantially equal in length to the length of the antenna spacing and the length of the oscillator line $L_0$ from that particular antenna unit to the base at antenna $A_1$. As the action of the modulators at the individual antenna units is to produce a difference frequency of a relatively low value as compared with the signal frequency and oscillator frequency, it is unnecessary to employ for the transmission of the intermediate frequencies to the station the more expensive type of high frequency line that is employed in systems where the signal frequency is not modulated until it reaches the terminal station. The only high frequency line of the more expensive type that needs to be used in the system shown in Fig. 7 is the oscillator line $L_0$ extending the length of the array and common to all of the units.

The remote control from the terminal station of the modulator selecting switches at each of the units of the array may be accomplished in a variety of ways. One practical way for effecting such remote control is diagrammatically indicated in Fig. 14. As shown in this figure, a plurality of conductors extends the length of the array with branching connections from each conductor to corresponding modulator selecting apparatus at each of the antenna units. One of the conductors is a common return, and the others are selectively energized by controlling switches at the terminal station. In the present instance, three selectively energized conductors 16, 17 and 18 are illustrated, one for each signal frequency for which modulators are provided at the antenna units, and a common return conductor 19. Each of the selecting conductors is controlled by a corresponding one of the keys 20, 21 and 22. These keys cooperate with a sliding latch bar 23 in such a way that when any key is pressed to close its associated contact it remains operated until another one of the associated keys is pressed.

At each antenna unit there is a switch 24 having a plurality of rotatable members, and as many cooperating contacts for each member as there are units of apparatus to select. The switch 24 is rotated by means of a motor 25 through reducing gears.

The shaft carrying the rotatable switch members also carries a plurality of discs 26, 27 and 28, there being as many discs as there are positions to be selected by the rotating switch members. These discs are electrically conductive and have conductive connection with the shaft that carries them. A brush 29 rests upon and makes conductive connection with the shaft, to establish connection between the discs and the conductor 19 by way of the windings of the driving motor 25. Each disc has a short insulating segment set into its periphery and these segments are progressively displaced in the series of discs by an angular amount equal to the angular displacement of the selecting contacts of the switch 24. Each disc has a contact resting on its periphery and connected with a corresponding one of the selecting conductors 16, 17 and 18.

As illustrated in the drawings, key 20 at the terminal station has been depressed to select the first of the switch positions, from left to right. Assuming that at the time the key was pressed the switch was resting in some other position than that shown, the pressing of key 20 closes an energizing circuit that extends by way of conductor 16, and through branches at all of the antenna unit positions, through the conducting portion of the discs 26 at each station, the metallic shaft that carries them, the brush 29 and the motor 25 to the return conductor 19. The motor 25 at all the antenna unit positions is thus energized and rotates its shaft until the circuit is broken by the arrival of the insulating segment in disc 26 under the associated contact brush. When this occurs the motor stops and the switch mechanism at each antenna unit is left in the position shown in the drawings, in which position it remains until another key is pressed at the terminal station.

The phase relation of the signal components arriving at the receiving station phase changers over the intermediate frequency lines from the various antenna units have already been set forth in connection with the discussion of Figs. 1 to 6, inclusive. The arrangement illustrated in Fig. 7 corresponds with that of Figs. 5 and 6 with respect to the location of the tuning oscillator at the receiving station. If the frequency of the tuning oscillator in Fig. 7 is assumed to be above the signal frequency, the result with respect to phase differences between the contributions of each pair of the series of antenna units at the phase changers corresponds with that expressed in Fig. 5; and if the tuning oscillator frequency is below the signal frequency, the result with respect to phase differences in the arrangement of Fig. 7 corresponds with that expressed in Fig. 6. Whether the oscillator frequency is above or below the signal frequency, in either case the phase changers $PC_1$, $PC_2$, $PC_3$, etc., receive an initial setting in which each successive phase changer is set a certain number of degrees more negative than the preceeding phase changer, this difference corresponding, in complete 360-degree cycles of rotation, to the constant term $-2D/\lambda_i$. As the variable term in the expression, that is $D/\lambda_s (1+\cos \Delta)$, is a negative term when the oscillator frequency is above the signal frequency and is a positive term when the oscillator frequency is below the signal frequency, the only difference between the two cases it that, after the initial setting to satisfy the phase difference requirement of the constant term, the phase changers are turned in a negative direction to steer when the oscillator frequency is above and in a positive direction to steer when the oscillator frequency is below the signal frequency.

If it is assumed that in the arrangement of Fig. 7 the tuning oscillator is placed at the remote end of the array, that is, if the block at the left-hand end of oscillator line $L_0$ is marked TO and the block at the right-hand end of the line is marked I, then, as has already been shown in the comparison of Fig. 1 with Fig. 3 and Fig. 2 with Fig. 4, the phase difference relations between the different contributions at the phase changers $PC_1$, $PC_2$, $PC_3$, etc. becomes exactly the same as in the ordinary multiple unit steerable antenna systems, and steering is effected by means of the phase changers in exactly the same way that it is effected in those systems. It may be observed that in case it should be desirable to practice the present invention in the embodiment in which the tuning oscillator is at the remote end of the array, this may be conveniently done by locating at the end of the array as many crystal-controlled oscillators as there are corresponding signal frequencies to be received, and selectively connecting the desired one of the oscillators with the oscillator line $L_0$ by means of a remote control switching system, such for instance as that shown in Fig. 14 and previously described.

Obviously, the phase changers $PC_1$, $PC_2$, $PC_3$, etc. will perform their function as well in one position of their associated intermediate frequency circuits as in another. This being the case, it becomes possible to employ a modified form of the invention as embodied in the arrangement illustrated in Fig. 8. In this embodiment, each phase changer is removed from the terminal station and placed at its own antenna unit in direct association with the modulators placed there. As a result of this the individual intermediate frequency lines may be dispensed with and a single intermediate frequency line $L_1$ substituted with a branch connection at each antenna unit with the phase changer individual to that unit. This common intermediate frequency line extends to the terminal station and is connected with a receiving apparatus as in Fig. 7.

When the phase changers are thus associated with their individual antenna units, remote control of the steering from the terminal station may be effected in a number of ways, one way being that which is indicated schematically in Fig. 15. As shown, there is located at each antenna unit a phase changer driving motor 30 and all of these motors are synchronously driven, or are electrically interlocked so that all move together. The motors drive their respective phase changers through properly related gears so that the rotation of each phase changer is proportional to the spacing between its associated antenna unit and the base unit of the array. One of the synchronous or electrically interlocked motors 30 is located at the terminal station and drives the pointer of an indicating dial 31 through the same gearing ratio as is employed between the motor and phase changer of the adjacent unit of the array, that is, the first unit from the base station unit. The controlling attendant is thus informed of the position to which the adjacent unit phase changer has been advanced, which is an index of the positions to which all of the other phase changers of the array have been advanced.

Figure 8:
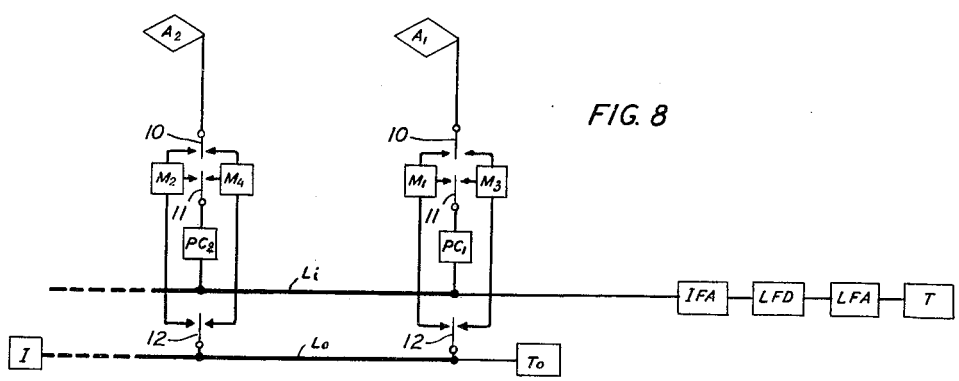
Fig. 8 illustrates an arrangement similar to that of Fig. 7, excepting that the phase changers are removed from the receiving station and are located each at its corresponding antenna unit.
Figure 9:
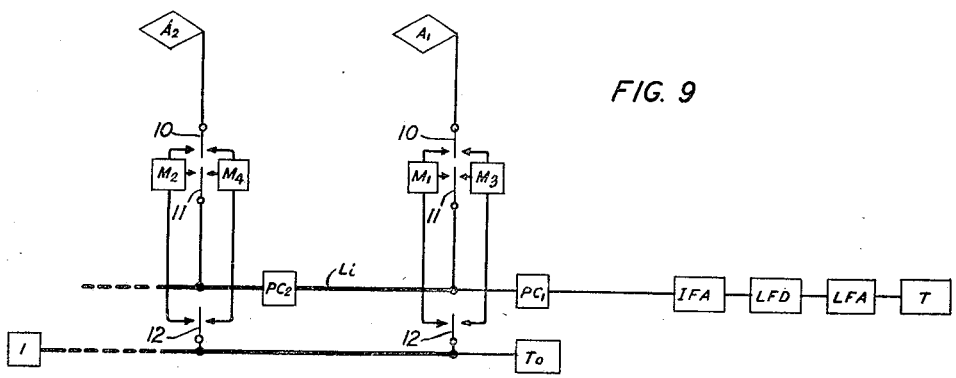
Fig. 9 illustrates an arrangement similar to that of Fig. 8, excepting that the phase changers are included at their antenna units in series in the intermediate frequency line, instead of in the branches from the line to the antenna unit modulators.

Fig. 9 illustrates a system like that of Fig. 8, excepting that the phase changers individual to the various antenna units, instead of being included in branches from the common intermediate frequency line to the modulator outputs of the associated antenna units, are included in series in the intermediate frequency line, each at its associated unit and each in series with the section of the intermediate frequency line between its connecting points with two adjacent units. When the phase changers are thus connected, their effect in the intermediate frequency line is additive from one section to another, and the angular displacement of all of the phase changers in the steering operation may be the same. When thus connected each may be driven by its associated synchronous or electrically interlocked motor without the interposition of differential gear ratios between the motors and the successive phase changers of the array.

Referring again to the arrangements illustrated in Figs. 5 and 6, the phase difference in complete cycles of rotation between the outputs of the two adjacent modulators $M_1$ and $M_2$ at the combining point has been shown to be $D/\lambda_s (1-\cos \Delta) -2D/\lambda_0$ in Fig. 5 where the oscillator frequency is above the signal frequency, and $D/\lambda_s (\cos \Delta - 1) + 2D/\lambda_0$ in Fig. 6 where the oscillator frequency is below the signal frequency, the expression in each case arbitrarily representing the phase subtraction of the output of modulator $M_1$ from the output of modulator $M_2$. The presence of the term $2D/\lambda_0$ in each expression indicates that the phase difference between the outputs may be controlled by controlling the value of the quantity $\lambda_0$, that is, the oscillator wave-length.

An in-phase relation between the modulator outputs is obtained when the phase difference between them is represented by zero, or by any difference amounting to any number of complete 360-degree cycles of rotation. As the value of each expression is assumed to be expressed in complete cycles of 360 degrees, it follows that when the phase difference is equal to N, which may be zero or any integral number, the result is an in-phase addition of the outputs at the combining point. In other words, in-phase addition of the outputs of any pair of adjacent antenna units will occur if $$D/\lambda_s (1-\cos \Delta) - 2D/\lambda_0 = \pm N$$

where the oscillator frequency is above the signal frequency; and also if $$D/\lambda_s (\cos \Delta - 1) + 2D/\lambda_0 = \pm N$$

where the oscillator frequency is below the signal frequency. When this relationship is satisfied by properly adjusting the beat oscillator frequency, it follows that the contribution of each antenna unit will be added in phase with contributions of each and every one of the preceding units of the array for any chosen signal frequency and angle of arrival. In other words, variation of the oscillator frequency will variably steer the directional characteristic of the array.

For example, let a case be assumed in which it is desired to select an oscillator frequency above the signal frequency, as in Fig. 5, for steering the directional characteristic of the array for a given signal frequency and a given angle of arrival. Let it further be assumed that the signal frequency $f_s=20$ megacycles, with a wavelength $\lambda_s$ of 15 meters; that the angle of arrival $=41°\ 25'$ with a value for $\cos \Delta$ of 0.75, and that the antenna unit spacing, which also is the length for the oscillator line $L_0$ and the intermediate frequency line $L_i$, is 200 meters. Substituting these known values, and choosing the integer N of such value as to satisfy the initial assumption that the oscillator frequency shall be greater than the signal frequency, in the present case the integer $-30$, it immediately appears that the oscillator wave-length $\lambda_0$ is 12 meters and the oscillator frequency $f_0$ is 25 megacycles, which is 5 megacycles above the assumed signal frequency $f_s$ of 20 megacycles. The difference product of modulation of these two frequencies is 5 megacycles, which is the frequency carrying the signal that passes over the intermediate frequency line.

Applying the expression $$D/\lambda_s (1-\cos \Delta) - 2D/\lambda_0 = \pm N$$

to an assumed case where D equals 200 meters, $\lambda_s$ equals the wave-length corresponding either to a 6-megacycle or to a 20-megacycle signal frequency, and $\Delta$ equals either $11°\ 28'$ with a $\cos \Delta$ of 0.98 or $41°\ 25'$ with a $\cos \Delta$ of 0.75, it appears that by assuming N equals $-10$ for the 6-megacycle signal wave and $-30$ for the 20-megacycle signal wave, the steering of the directive characteristic of the array through the full angular range indicated may be secured by a variation of the oscillator frequency from 7.55 megacycles to 8.25 megacycles for the 6-megacycle signal frequency, and that the steering of the directional characteristic of the array through the full angular range indicated may be accomplished by the variation of the oscillator frequency from 22.7 megacycles to 25 megacycles for the 20-megacycle signal frequency.

Similarly, applying the expression in the form it assumes when the oscillator frequency is below the signal frequency, that is, $$D/\lambda_s (\cos \Delta - 1) + 2D/\lambda_0 = \pm N$$

to an assumed case the same as the above with respect to the values of D, $\lambda_s$, and $\cos \Delta$, it appears that by assuming N equals $+5$ for the 6-megacycle signal wave and $+20$ for the 20-megacycle signal wave, the steering of the directive characteristic of the array through the full angular range indicated may be secured by a variation of the oscillator frequency from 3.8 megacycles to 4.5 megacycles for the 6-megacycle signal frequency, and that the steering of the directional characteristic of the array through the full angular range indicated may be accomplished by the variation of the oscillator frequency from 15.2 megacycles to 17.5 megacycles for the 20-megacycle signal frequency.

It appears from the cases assumed above that the intermediate frequencies representing the difference products of modulation range from a maximum of 5 megacycles to a minimum of 1.5 megacycles. The range of intermediate frequencies may be held within desired limits by choosing such values for the integers N as will produce oscillator frequencies lying either above or below the signal frequencies and separated therefrom by such frequency differences as will be sufficient to secure the desired range of angular steering of the directional characteristic.

Figure 10:
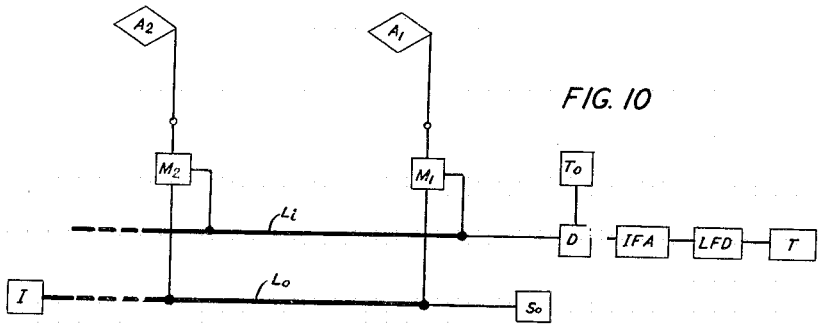
Fig. 10 shows schematically the terminal station and the first two antenna units of an array in which the steering of the directional characteristic of the array is accomplished by varying the frequency of the steering oscillator.

Fig. 10 illustrates schematically receiving station apparatus and two antenna units of a simplified form of system for steering the directional characteristic of the array by varying the frequency of a beat oscillator. Modulators $M_1$ and $M_2$ are located at antenna units $A_1$ and $A_2$, respectively, and oscillator line $L_0$ extends along the array from the steering oscillator SO at the receiving station to the impedance termination I at the distant end of the array. The oscillator line has a connection at each antenna unit to the modulator of that unit, and the output of each modulator is connected to the common intermediate frequency line $L_i$ which extends back to the receiving station. At the receiving station the signal frequencies flowing over the intermediate frequency line are further modulated in the detector D by a frequency supplied by the tuning oscillator TO, and the products of the second modulation, thus reduced to an intermediate frequency of the proper level, are amplified in the intermediate frequency amplifier IFA, the signals are detected in the low frequency detector LFD and thence pass to the translating device or receiver T.

For purposes of illustration we may assume the same specific example as before. That is, we may assume that the antenna separation is 200 meters, that the modulators $M_1$ and $M_2$ are tuned to a signal frequency of 20 megacycles, that the signal is arriving at an angle of $41°\ 25'$, and that the system is arranged to operate with the oscillator frequency above the signal frequency. Under these assumptions an adjustment of the steering oscillator SO at the receiving station to a frequency of 25 megacycles steers the directive characteristic of the array to coincide with the assumed arrival angle of the 20-megacycle signal frequency, with the result that the output of each modulator is combined in phase at its junction point with the intermediate frequency line with the outputs at the assumed signal frequency and arrival angle of all other antenna units of the array.

The intermediate frequency products of modulation that pass over the intermediate frequency line $L_i$ are approximately but not sharply limited to the breadth of the carrier and its signal sidebands to which the modulators $M_1$, $M_2$, etc. are tuned. The intermediate frequency also in the case assumed, lies at an average frequency level of 5 megacycles. But this frequency level changes in the steering oscillator frequency for different signal frequencies and different angles of arrival. By means of the intermodulation which occurs in the detector D under the control of the tuning oscillator TO this variable intermediate frequency level is placed at the fixed frequency level at which the intermediate frequency amplifier IFA is designed to operate. The sharp selectivity of the intermediate frequency amplifier excludes the outlying undesired frequencies and narrows the band down to the desired signal components. These are then detected in the low frequency detector LFD and pass to the receiver T.

Figure 11:
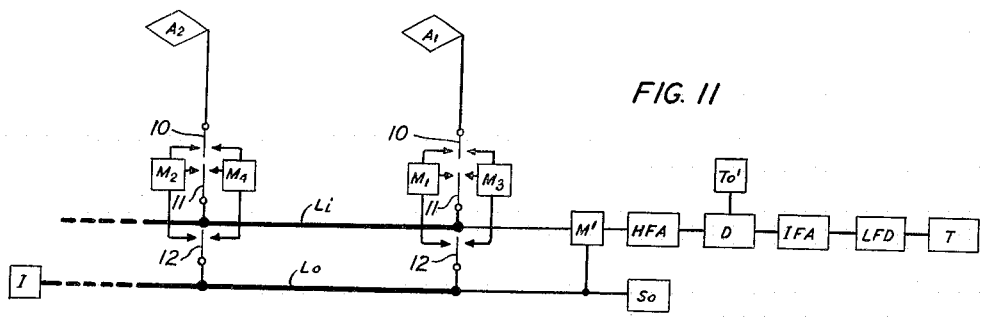
Fig. 11 illustrates an arrangement similar to that of Fig. 10, excepting that a plurality of modulators each responsive to a different signal frequency are employed at each antenna unit, and provision is made at the terminal station for remodulating the intermediate frequencies to restore them to their original frequency values.

The necessity present in the system of Fig. 10 of adjusting the tuning oscillator TO with every change in the adjustment of the steering oscillator SO to place the intermediate frequency band at the proper level is avoided in the system illustrated in Fig. 11. While this system differs from that of Fig. 10 in including a plurality of tuned modulators and associated remotely controlled switching mechanism, such as described in connection with the systems of Figs. 7, 8 and 9, the principal point wherein it differs from the system of Fig. 10 is in the provision of the modulator M'. One of the input paths of this modulator M' receives the intermediate frequencies from the line $L_i$ and the other is connected with the steering oscillator SO. As a result the difference products of modulation that resulted from the intermodulation of the signal frequencies with the steering oscillator frequency in the selected modulators at the antenna units are combined with the oscillator frequency to reproduce, as the sum product of modulation, the signal frequencies at their original frequency level. These reappear at the output of the modulator M'. From this point on the signal frequencies are treated in the conventional manner of short wave radio receiving systems by amplification and band limitation in the high frequency amplifier HFA, reduction to the proper intermediate frequency level by modulation with the output of the tuning oscillator TO in detector D, and the usual intermediate frequency amplification and low frequency detection for final reception in the translating device T. With respect to the steering of the directional characteristic of the array by the steering oscillator SO so as to produce in-phase contribution to the intermediate frequency line $L_i$ of all antenna units for the selected wave arriving at the angle to which the array is steered, the operation of the system of Fig. 11 is the same as that described in connection with the system of Fig. 10.

In the existing multiple unit antenna systems the outputs of the individual antenna units are combined through different sets of phase changers in such a way as to provide for simultaneous reception from two or more different angles. These different outputs are then combined in what is familiarly known as a diversity system, which either introduces a compensating delay in one or more of the different circuits before direct combination, or by automatic means selects the best of the signals arriving at the different angles.

Figure 12:
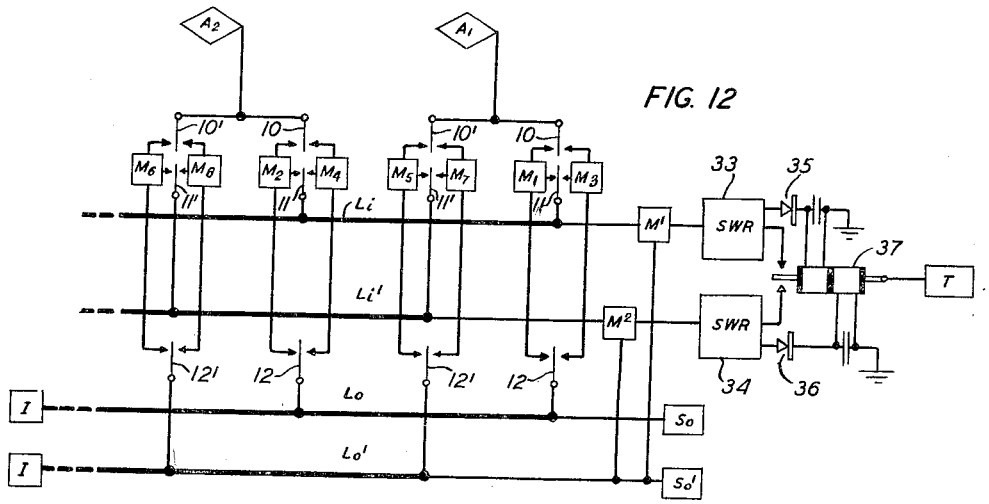
Fig. 12 illustrates schematically the terminal station and the first two antenna units of an array such as shown in Fig. 11 in which provision is made for diversity operation; that is, for steering a plurality of major lobes of the array at different vertical angles for the reception of the same or different signal frequencies arriving along different angular paths.

The system of the present invention, in which variation of oscillator frequency instead of phase change adjustment is used for steering, is capable of employment for diversity operation. One manner in which this may be accomplished is schematically illustrated in Fig. 12, which shows the receiving station apparatus and two antenna units of an array. This system, it will be noted, is essentially two complete circuit arrangements such as shown in Fig. 11, there being an additional intermediate frequency line $L'_1$ with its terminal station modulator $M^2$, an additional oscillator line $L'_0$ and associated steering oscillator SO', and an additional pair of modulators, $M_5$, $M_7$ and $M_6$ and $M_8$, respectively, at each antenna unit. The connections of these additional pairs of modulators at each antenna unit with their associated antennas, intermediate frequency line $L'_1$ and oscillator line $L'_0$ are controlled by additional switching members $10'$, $11'$, $12'$ that are remotely controlled from the terminal station in the same manner as described in connection with the systems of Figs. 7, 8 and 9.

Let it be assumed in the system of Fig. 12 that it is desired to select and utilize automatically the better of two signals arriving at the same signal frequency but at different arrival angles. As illustrated in Fig. 12, each antenna unit is equipped with four tuned modulators, two being tuned to one signal frequency and the other two being tuned to another signal frequency. That is, modulators $M_3$ and $M_7$ at unit A1 and modulators $M_4$ and $M_8$ at unit A2 are tuned to one of the signal frequencies, and modulators $M_1$ and $M_5$ at unit A1, and modulators $M_2$ and $M_6$ at unit A2 are tuned to the other signal frequency. If it is assumed that it is the first of these signal frequencies that is to be received, remote control is exercised from the terminal station to move the switching members 10, 11, 12 and $10'$, $11'$, $12'$ at all units of the array to their right-hand positions. When this is done the modulators $M_3$, $M_7$, $M_4$ and $M_8$ are brought into operative relation with their respective antennas and intermediate frequency and oscillator lines. But it will be noted that of the two energized modulators tuned to the same frequency at each antenna unit, one receives its oscillator frequency input from steering oscillator SO by way of line $L_0$ and delivers its output to intermediate frequency line $L_1$, while the other modulator at each antenna unit receives its oscillator frequency input from steering oscillator SO' by way of line $L_0'$ and delivers its output by way of intermediate frequency line $L_1'$. Thus the output phases of one series of modulators throughout the array are under the control of steering oscillator SO while the output phases of the other series of modulators throughout the array are under the control of steering oscillator SO'. Thus the directional characteristic of reception of the same signal wave may be steered to coincide with two different angles of arrival of the signal. When the remotely controlled switching controls, 10, 11 and 12 and $10'$, $11'$ and $12'$ are moved into their alternate positions, the steering oscillators SO and SO' may similarly be used to steer the directional characteristic of the array at two different angles of arrival of the signal to which the modulators $M_1$, $M_5$ and $M_6$ are tuned.

The intermediate frequencies produced by steering oscillator SO are acted upon in modulator M' and the intermediate frequencies produced by a steering oscillator SO' are acted upon in modulator $M^2$ to reproduce in the outputs of these modulators the original in-phase signal frequencies representing, respectively, the two different arrival angles determined by the adjustment of the two steering oscillators. The output of modulator M' passes to the short wave receiving apparatus 33 and the output of the modulator M² passes to the short wave receiving apparatus 34. These short wave receivers may be of the conventional type indicated by the series of blocks shown in Fig. 11.

A portion of the outputs of the short wave receivers 33 and 34 is rectified in the devices 35 and 36; the alternating current portions of the outputs being by-passed to ground by way of the two associated condensers, and the direct current components energizing the windings of the relay 37. These windings are differential in their effect upon the armature of the relay, which relay preferably is of the polarized type. When the effect of the winding associated with receiver 33 predominates, the armature of the relay is moved to close its upper contact to cause the translating or telephone receiving apparatus T to respond to the stronger signal arriving by way of the angle represented by receiver 33. If the signal arriving at this angle weakens and the signal arriving at the angle represented by receiving apparatus 34 strengthens, the effect of the associated winding of the differential relay predominates, and the telephone receiver is switched from the weaker to the stronger signal. The adjustment and action of the relay 37 is such that the switching from one arrival angle to the other does not take place until there is a definite predetermined increase in strength of the stronger signal over the weaker signal.

Figure 12A:
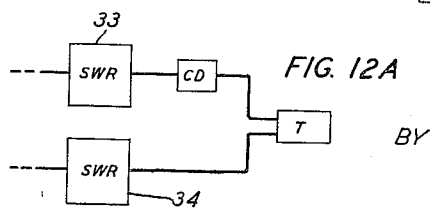
Fig. 12A illustrates an alternative output circuit for the system of Fig. 12.

If it is desired in the diversity system of Fig. 12 to add the effects of the signals of the same frequency arriving at different angles instead of utilizing the stronger of the two, this may be done by means of the modification illustrated in Fig. 12A. Here, in accordance with the well understood practice in diversity systems of this general type, a compensating delay CD is introduced in the branch representing the signal arriving at the lower angle to cause it to combine in phase with the signal arriving over the longer space path at the higher arrival angle.

Figure 13:
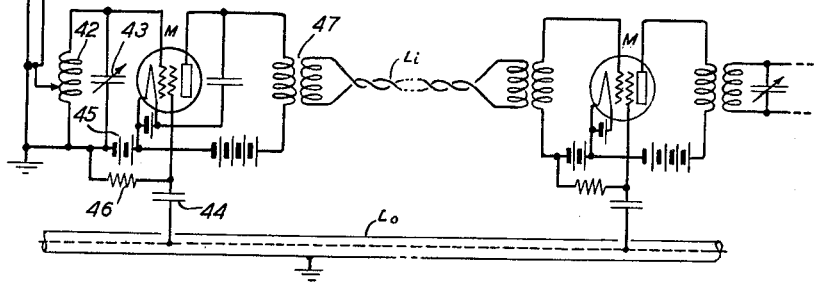
Fig. 13 illustrates diagrammatically circuit connections which may be employed for an antenna unit modulator and the associated terminal station modulator in a system where steering is accomplished by varying the frequency of the steering oscillator.

Entirely conventional circuit arrangements may be employed in the units of apparatus shown in the box schematic diagrams. One of the circuit arrangements which may be conveniently employed for an antenna unit modulator M and its interconnected terminal station modulator M' is illustrated in Fig. 13. The rhombic antenna unit 38 has at one end the usual terminating resistance 39 to give it a unilateral propagation characteristic, and at the other end is connected by way of the usual coupling unit 40 with the vertical coaxial conductor 41 which connects the antenna with the modulator M.

The modulator M is of the two-grid type, the potential of one of the grids responding to the incoming signal and that of the other responding to the steering oscillator frequency. The signal frequency is applied to its grid by way of the inductive coupling 42 and tuning condenser 43; and the steering oscillator frequency is applied to its grid by way of a high impedance coupling in the form of a condenser 44 of very small capacity. The grids are maintained at the proper operating potential by means of the biasing battery 45, the connection of the battery with the oscillator-controlled grid being by way of the grid leak 46. The output of the modulator M is applied to the intermediate frequency line L₁ by way of the transformer 47. The oscillator line L₀ is preferably a coaxial cable. The intermediate frequency line L₁ may, if desired, be of a simple open-wire type with suitable transpositions to avoid pick-up noise.

At the terminal station the intermediate frequencies are applied to the modulator M'; also preferably of the two-grid type, by way of one of the modulator grids, the other grid being connected with the oscillator line by way of a low capacity condenser acting as a high impedance coupling. As in the case of the modulator M, the grids of the modulator M' are maintained at the proper operating potential by means of a biasing battery and grid leak. The output of the terminal station modulator M' is connected with the conventional short wave receiving apparatus, as shown schematically in the system of Fig. 11.

What is claimed is:

1. A directive radio system comprising a plurality of spaced antenna units constituting an array and a corresponding plurality of similarly spaced modulators each positioned at and directly connected through a path of negligible length to a different unit, a transmission line, a high frequency oscillator connected to said line, said modulators being connected to said line at points separated a distance substantially equal to the spacing between said units, a translation device at a terminal station, and a common intermediate frequency line extending to said device and having connection at each of the antenna unit locations with the associated modulator.

2. A system in accordance with claim 1, a plurality of uncontrolled phase changers, said modulators being connected through separate phase changers to said common intermediate frequency line, whereby the directive characteristic of the array may be steered.

3. A directive radio system comprising a plurality of spaced antenna units constituting an array, a plurality of differently tuned modulators positioned at each antenna and adapted to be connected alternatively through a path of negligible or inconsequential length to their associated unit, a transmission line, a high frequency oscillator connected to said line, a translation device at a terminal station, and switching means at each unit controllable from said terminal station for alternatively selecting and connecting one or another of the associated tuned modulators to the associated antenna unit, to said transmission line, and to said translation device at the terminal station.

4. A system in accordance with claim 3, a plurality of uncontrolled phase changers, said selected modulators being connected through separate phase changers to said translation device, whereby the directive characteristic of the array may be steered.

5. A system in accordance with claim 1, the frequency of said oscillator being adjustable, whereby the directive characteristic of the array may be steered.

6. A system in accordance with claim 1, said oscillator being adjustable, a second modulator at the terminal station, said high frequency oscillator and the outputs of said first mentioned modulators being connected to the input terminals of the second modulator and said translation device being connected to the output terminals of the second modulator, whereby the signal frequencies supplied by said sceond modulator to said translation device are restored to their original values.

7. A directive radio system comprising a plurality of spaced antenna units constituting an array, a plurality of modulators for each unit, each of said modulators being positioned at and directly connected through a path of negligible length to the associated unit, a corresponding plurality of intermediate frequency lines connecting a corresponding one of the plurality of modulators at each unit with a terminal station, a corresponding plurality of transmission lines each connected to a corresponding one of said plurality of modulators at each unit at points separated a distance substantially equal to the spacing between said units, an adjustable high frequency oscillator connected to each of said transmission paths, a translation device at said terminal station, and means for connecting said device to said plurality of intermediate frequency lines, whereby the directive characteristic of said array may be simultaneously steered at different angles.

8. In a radio system, a multiple unit steerable antenna array comprising spaced antenna units, a modulator positioned at and connected to each unit, an adjustable steering oscillator, a translation device, a single line connecting said oscillator to the input terminals of said modulators and a single line connecting the output terminals of said modulators to said device.

9. In a radio system, a linear array comprising a plurality of spaced antenna units, a translation device, an adjustable high frequency oscillator, a plurality of modulators, each modulator being positioned at and connected to a different antenna unit through a path of negligible length, a single high frequency line for conveying high frequency energy connecting said oscillator and said modulators, and a single line for conveying relatively low or intermediate frequency current connecting said modulators to said device.

10. In a radio system, a linear array comprising a plurality of spaced antenna units, a separate modulator and a separate adjustable phase changer positioned at each unit, an oscillator, a line connected thereto, said modulators being connected to said line at points separated a distance equal to the antenna spacing, a translation device, each unit being connected through its associated modulator to its associated phase changer, a common intermediate frequency line connecting said phase changers to said device, and means controlled at said device for simultaneously adjusting said phase changers each an amount related to the spacing between the associated antenna unit and another antenna unit.

11. In combination, a linear array comprising a plurality of antenna units, a modulator positioned at and connected to each of said units, a translation device comprising a steering oscillator, a tuning oscillator connected to a final detector, a line connecting said steering oscillator to the input terminals of said modulators and a line connecting the output terminals of said modulators to said tuning oscillator, the connections from said modulators to said lines being spaced on each line a distance equal to the antenna spacing.

12. In combination, a linear array of spaced antenna units, a plurality of modulators each having its input terminals connected to a different antenna unit, a high frequency line, a high frequency oscillator connected thereto, an intermediate frequency line, a translation device connected thereto, the input terminals of said modulators being connected to said high frequency line at points spaced a given amount and the output terminals of said modulators being connected to said intermediate frequency line at points spaced a similar amount, whereby in effect each modulator is connected between corresponding points on said lines.

13. In combination, a linear array of spaced antenna units, a plurality of modulators each having its input terminals connected to a different antenna unit, a high frequency oscillator connected through paths of different lengths to the input terminals of said modulators, a translation device connected through paths of different lengths to the output terminals of said modulators, the paths connecting each modulator to the oscillator and to the device being equal in length.

14. In combination, a linear array of spaced antenna units, a plurality of modulators each having its input terminals connected to a different antenna unit, a high frequency oscillator connected through paths of different lengths to the input terminals of said modulators, a translation device connected through paths of different lengths to the output terminals of said modulators, the paths extending from said oscillator to said device and each including a different modulator being equal in length.

RALPH K. POTTER.